April 10, 1962  J. J. SPICER, JR  3,028,926
SAFETY MEANS FOR CONTROL CIRCUITS FOR VEHICLE
AUTOMATIC TRANSMISSIONS
Filed June 10, 1959  3 Sheets-Sheet 2

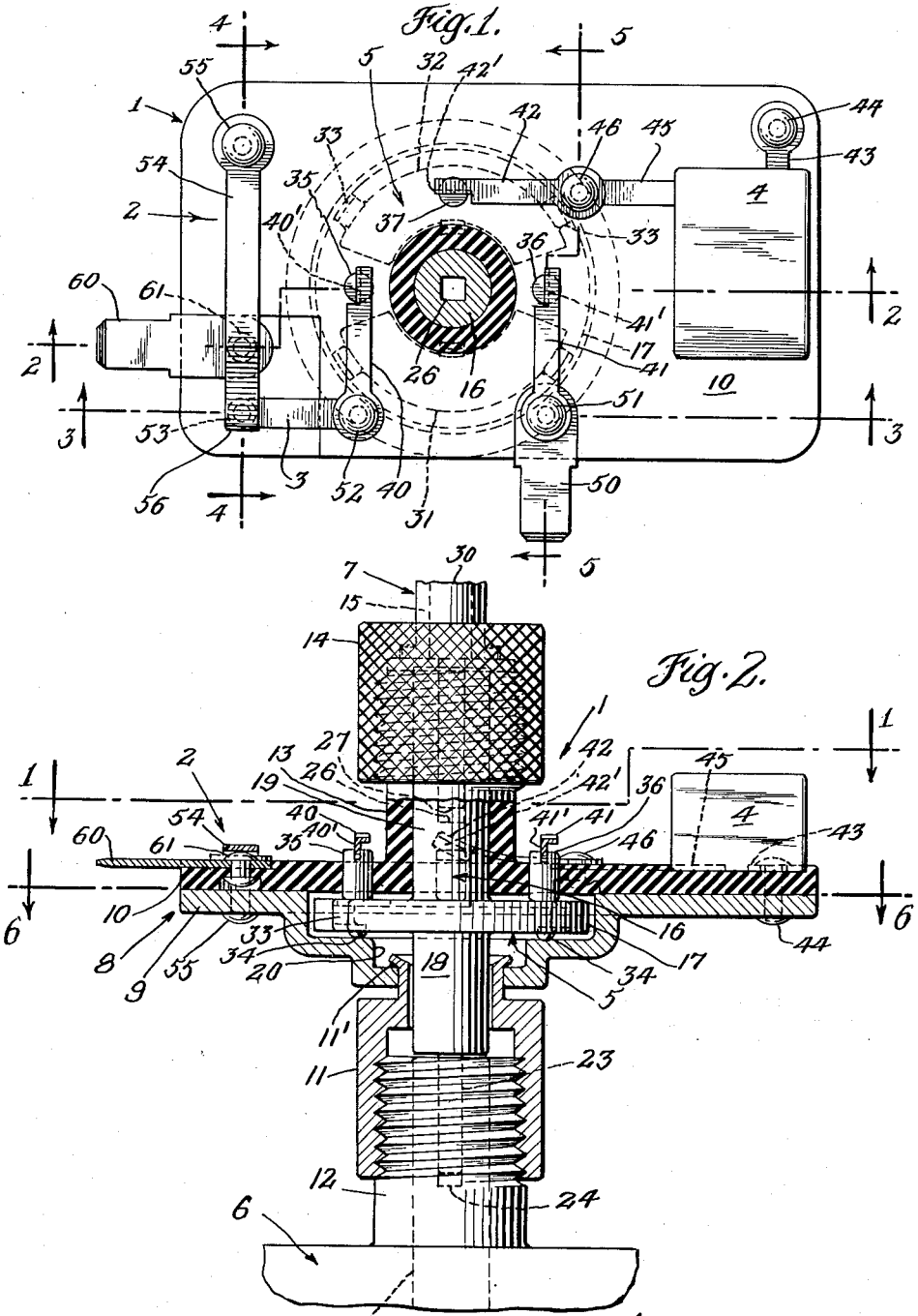

INVENTOR
John J. Spicer Jr.
BY
Synnestvedt & Lechner
ATTORNEYS

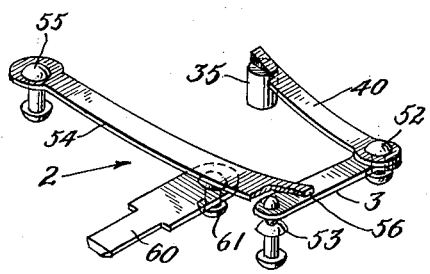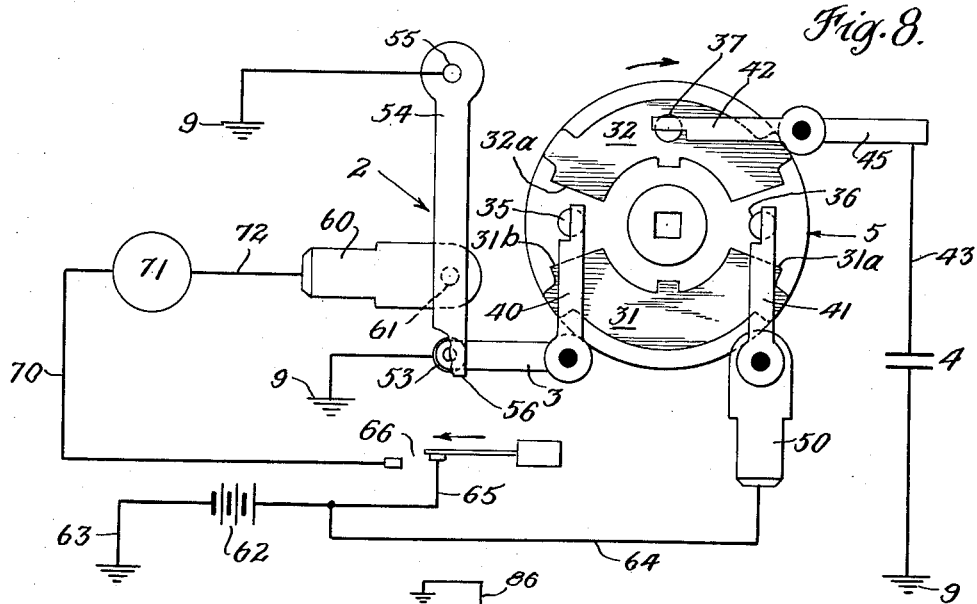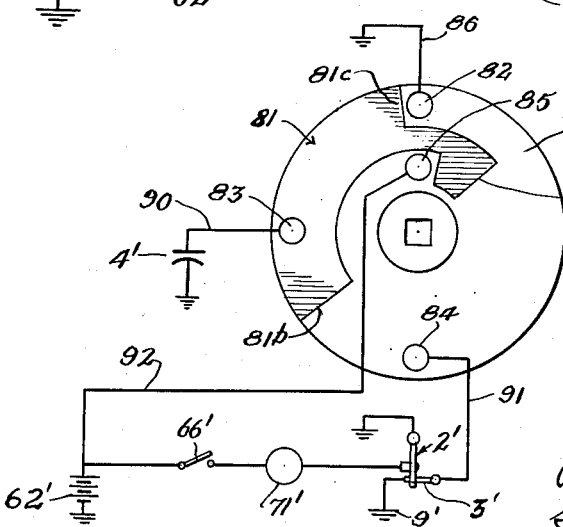

![United States Patent Office logo] 3,028,926
Patented Apr. 10, 1962

3,028,926
SAFETY MEANS FOR CONTROL CIRCUITS FOR VEHICLE AUTOMATIC TRANSMISSIONS
John J. Spicer, Jr., Philadelphia, Pa., assignor to Novo Industrial Corporation, a corporation of New York
Filed June 10, 1959, Ser. No. 819,352
9 Claims. (Cl. 180—82)

This invention relates to safety means for circuits used in controlling vehicle automatic transmissions and in particular relates to means to prevent operation of the transmission for causing motion of the vehicle in the reverse direction when the transmission is causing motion of the vehicle in the forward direction.

Automatic transmissions of the kind for which the invention is particularly adaptable are provided with electrically-operated mechanism to control the transmission so that the same has several different conditions of operation, for example, a neutral condition where no power is transmitted from the motor to the wheels, a reverse condition where power is transmitted from the motor to the wheels so that the vehicle moves backwards, and a forward condition wherein power is transferred from the motor to the wheels so that the vehicle moves in a forward direction at one or more selected power ratios, for example, low or high. The selection of the condition of the transmission operation is usually made by means of an operator-actuated-selector device, such as a movable lever, or more usually by means of so-called push buttons.

With transmission apparatus of the kind under consideration it often happens that the operator will erroneously actuate the selector device to set up the transmission for reverse operation when the transmission is currently causing motion of the vehicle in the forward direction. This presents a very serious hazard from the standpoint of both personal injury and damage to the vehicle.

The principal object of the invention is to provide means for use with a transmission having electrically-operated control mechanism which makes it impossible to condition the transmission for reverse operation when the same is already conditioned for moving the vehicle in the forward direction.

The invention contemplates that the electrical control mechanism for conditioning the transmission for reverse direction operation be energized through a safety switch which is normally closed but which will be automatically opened when the vehicle is moving in the forward direction and particularly when the forward speed is in excess of a predetermined amount, making it impossible for the control mechanism to operate even though the operator actuates the selector device.

Preferably the safety switch is physically opened and closed by means of a device which will distort with heat, the distortion of the device causing the opening of the safety switch and its return to normal form causing a closing of the switch. The device may take the form of a bimetal or hot wire element with heat being generated by way of passing a current through the same, the current being supplied by the discharge of a capacitor which is charged and discharged by way of a rotary switching means driven as a function of the vehicle motion.

A preferred construction of the invention will be described following in connection with the drawings wherein:

FIGURE 1 is a plan sectional view taken on the line 1—1 of FIGURE 2 and illustrating a construction of the invention for use in inserting between the vehicle speedometer and its cable;

FIGURE 2 is a longitudinal section taken on the line 2—2 of FIGURE 1;

FIGURE 7 is a perspective view of certain of the elements of FIGURES 1–5;

FIGURE 8 is a schematic wiring diagram; and

FIGURE 9 is a schematic wiring diagram of a modified form of the invention.

Figure 3:
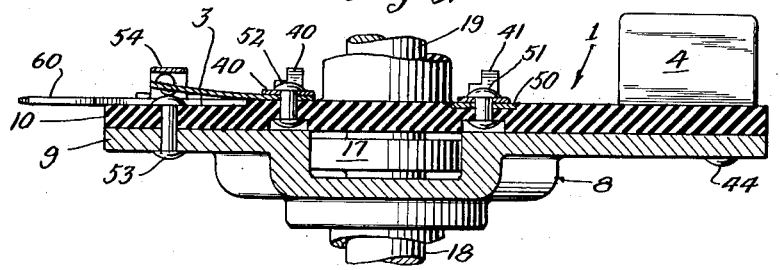
FIGURE 3 is a longitudinal section taken on the line 3—3 of FIGURE 1.

Certain of the components of the invention may be located at different places in the vehicle. However, it is desirable to locate as many of the components as possible in a unified structure. This has the advantage of lowering manufacturing and assembly costs and in making maintenance easier. Thus the structure shown in FIGURES 1 and 2 includes a unit 1 having a safety switch 2 adapted to be connected to the control mechanism for the vehicle transmission, a bimetal element 3 for opening and closing the safety switch, a capacitor 4 together with a rotary switching device 5 driven in accordance with the motion of the vehicle and adapted to effect the charging of the capacitor and the discharging of the same through the bimetal element. While it is possible to provide a drive which will operate the rotary switch so as to simulate the motion of the vehicle, the invention contemplates driving the switch by means already in the vehicle, for example, the speedometer cable. This has the advantage of providing a drive which is not only a function of vehicle motion, but also of vehicle speed.

Before proceeding it is pointed out that the term "bimetal" is used herein in the generic sense and includes an element formed of a plurality of metals having different thermal coefficients of expansion so that the element distorts with heat and to a metallic element which has a thermal coefficient of expansion causing a relatively large expansion or distortion with application of heat.

The unit 1 is inserted between the speedometer 6 and the speedometer cable 7. The unit includes a housing 8 having a metal frame 9, a base 10 made of insulating material and a nut 11 which is secured on the threaded extension 12 of the speedometer. The nut 11 is secured to the frame 9 by being staked over as indicated at 11′, the arrangement being such that while the nut is firmly in engagement with the frame it is capable of being rotated relative thereto, for example, for attaching and detaching the unit to and from the speedometer. For reasons which will be apparent later the metal frame 9 is grounded to the vehicle frame by means not shown. The base 10 has a threaded extension 13 on which is secured the speedometer cable nut 14. The nut when tightened up firmly interengages the unit with the sheath 15 of the speedometer cable.

The rotary switching device 5 includes a rotor 16 having a disk-like element 17 disposed within the space 20 formed by the metal frame 9 and the base 10. On one side of the disk 17 there is a hub 18 which extends through the nut 11 and on the other side of the disk 17 there is another hub 19 which projects through the extension 13 and is rotatably mounted thereby.

The hub 18 carries a square shank 23 which fits into a square aperture 24 in the speedometer shaft 25. The hub 19 has a square aperture 26 which accepts the square shank 27 secured to the core 30 of the speedometer cable. The foregoing construction provides driving interconnections in that rotation of the speedometer cable core 30 causes a rotation of the rotor 16 which in turn causes rotation of the speedometer shaft 25.

The rotary switching device also includes a pair of arcuately-shaped contacts 31 and 32 which are secured to the disk 17 by the bent-over tabs 33. As indicated, the arc of each of the contacts 31 and 32 is less than 180°. On the opposite face of the disk 17 there are bosses 34 which are in sliding engagement with the metal frame 9. Three contacts or terminals 35, 36 and 37 are spaced about the rotational axis of the rotor and extend through the base 10 to engage the disk 17, the terminals 35 and 36 being spaced 180° apart and the terminal 37 being at 90° to both of the latter. These terminals form part of the rotary switch. As will be apparent from an inspection of FIGURE 1, the terminals are adapted to be interengaged with the contacts 31 and 32 in accordance with the rotational position of the rotor.

The terminals 35, 36 and 37 are respectively in engagement with the conductors 40, 41 and 42, each of which has a bent-down portion 40', 41' and 42' which respectively are disposed in corresponding slots on the top of the terminals. Each of the conductors is preferably made of spring-like material so as to exert a pressure on the terminals to push the same in tight engagement with the disk 17. The pressure is sufficient to slidingly interengage the bosses 34 with the frame 9 so that the disk is yieldably held against axial motion and is freely rotatable.

The capacitor 4 has the usual pair of conducting plates, one of which is connected to the conductor 43 interconnected with the rivet 44 which grounds the capacitor to the metal frame as best indicated in FIGURE 2. The other plate of the capacitor is connected to a conductor 45 which is in electrical contact with the conductor 42, the two conductors being riveted to the insulating base 10 by means of the rivet 46.

The conductor 41 is in electrical contact with a conductor 50, both of the conductors being riveted to the insulating base by means of the rivet 51. The conductor 51 is adapted to be connected with a source of power as will be explained more in detail later.

The conductor 40 is in electrical engagement with the bimetal element 3, both of which are riveted to the insulating base 10 by means of the rivet 52. With reference to FIGURE 3, it will be noted that the bimetal element 3 is in contact with a rivet 53 which is in engagement with the metal frame 9 so that this end of the bimetal element is grounded to the frame.

Figure 4:
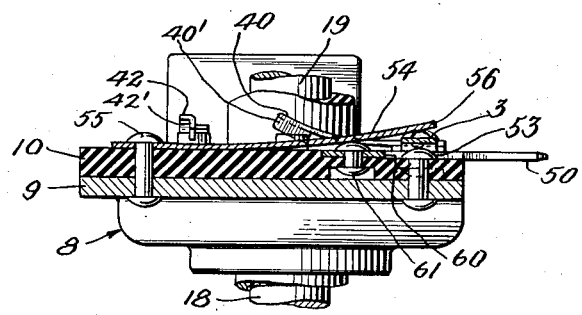
FIGURE 4 is a cross section taken on the line 4—4 of FIGURE 1.
Figure 5:
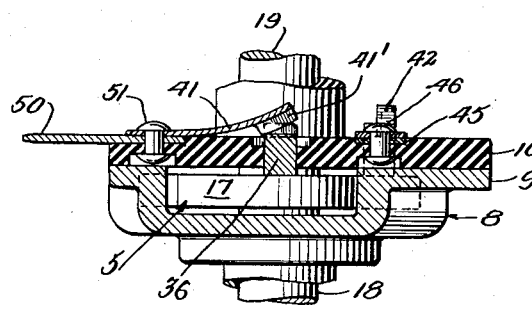
FIGURE 5 is a cross section taken on the line 5—5 of FIGURE 1.
Figure 6:
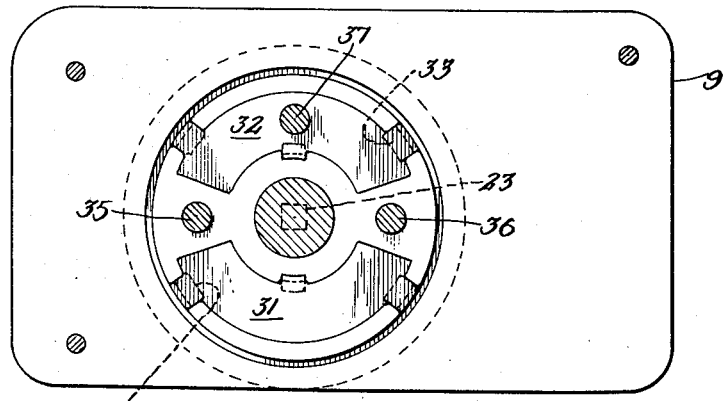
FIGURE 6 is a plan section taken on the line 6—6 of FIGURE 2.

The safety switch 2 has the blade 54, one end of which is grounded to the metal frame 9 by means of the rivet 55. With reference to FIGURE 4, it will be seen that the end 56 of the blade extends over the bimetal element but in the position shown is in contact therewith. A conductor 60 is riveted to the insulating base 10 by means of the rivet 61 and it will be observed that this rivet is in engagement with the blade 54. The conductor 60 is adapted to be interconnected to the control mechanism for the vehicle transmission in a manner which will be explained later.

It will be observed that if the bimetal element 3 distorts or expands (upwardly as viewed in FIGURE 1) it will engage the end 56 of the blade 54 and cause the same to move upwardly, which opens the safety switch by breaking the contact between the blade and the conductor 60.

In FIGURE 8 I have somewhat diagramamtically shown how the invention is applied to a control circuit for the vehicle transmission.

A power source 62 which ordinarily is the vehicle battery or generator has one side connected to ground (vehicle body) via a line 63. The other side is connected via a line 64 to the conductor 50 which, being connected to the conductor 41, provides a source of power for the terminal 36. The source 62 is also connected by a line 65 to a selector device 66 which, as shown, is in the form of a push button switch. The switch is in turn connected by a line 70 to a control mechanism 71 connected by line 72 to the conductor 60. In FIGURE 8 the capacitor 4 is shown to have one plate connected to ground (vehicle body) via the conductor 43 and the other plate connected to the terminal 37 via the conductors 45 and 42.

The switch 66 is an operational switch in that its normal function is to energize and de-energize the control mechanism 71, the control mechanism 71 when energized conditioning the automatic transmission for moving the vehicle in the reverse direction. When the switch 66 is closed a circuit is established from the source 62, line 65, switch 66, line 70, mechanism 71, line 72, conductor 60, blade 54 and thence to the other side of the source via ground.

It will be seen that if the engagement between the blade 54 and conductor 60 of the safety switch is opened, then the control mechanism cannot be energized. The maner in which the safety switch is opened will be explained following.

Assume that the rotor is in the position shown and that the vehicle is moving forward so that the speedometer cable rotates counter-clockwise.

The end 31a of the contact 31 engages the terminal 36 so that the source voltage appears on contact. As the rotor continues to rotate, the contact 31 remains in engagement with the terminal 36 and subsequently the end 31a engages the terminal 37 so that the source voltage is applied to the capacitor and the same starts to charge. The charge circuit includes one side of the source 62, line 64, conductor 50, conductor 41, terminal 36, contact 31, terminal 37, conductor 42, conductor 45 to one side of the capacitor with the respective other sides of the source and capacitor being connected together via ground. With further rotation the end 31b of the contact 31 leaves the terminal 36 and the capacitor remains charged. With further rotation the contact 31 remains in engagement with the terminal 37 and the end 31a engages the contact 35. This sets up the capacitor to discharge through the bimetal element 3. At the same time the end 32a of the contact 32 is engaged with the contact 36 so that the source voltage appears on the contact 32.

Upon the engagement of the contact 31 and terminal 35 a circuit is established from one side of the capacitor, conductor 45, conductor 42, terminal 37, contact 31, terminal 35, conductor 40, bimetal element 3 and thence through the rivet 53 and frame 9 to the other side of the capacitor. The motion continues and subsequently the end 32a of the contact 32 engages the terminal 37 so that the source voltage appears on the capacitor to charge the same.

With continued rotation the contact 32 remains in engagement with the contact 37 and then the end 32a engages the contact 35 and the capacitor discharges through the bimetal element 3. At the same time as the end 32a engages the terminal 35, the end 31a is engaging the terminal 36 and with continued rotation the charging and discharging is repeated as explained above.

With the repeated discharge of current through the bimetal element, the same heats up, distorts and moves in contact with the blade 54 to move out of engagement with the conductor 60 so that it is impossible to energize the control mechanism 71. Incidentally, it will be noted that when the bimetal has moved the blade 54 out of engagement, the bimetal remains grounded through the blade and rivet 55 so that discharge of the capacitor through the bimetal can continue.

From the foregoing it will be seen that forward motion of the vehicle effects a current flow through the bimetal element. The design of the bimetal element, the capacitor and the frequency of discharge may be coordinated so that a very slow forward speed will cause current flow through the bimetal to cause the same to open the safety switch. On the other hand, the unit may be arranged so that a substantial forward speed is required to produce enough current to cause the bimetal to distort, for example, in the order of ten miles per hour.

The latter is the preferred arrangement for the embodiment of FIGURE 8 because the capacitor is also charged and discharged when reverse operation of the vehicle causes the rotor to move clockwise. Thus in the embodiment of FIGURE 8 the safety switch will not open until the vehicle is traveling, say, ten miles per hour in either forward or reverse directions. The limit of ten miles per hour is high enough for most reverse driving conditions.

From an inspection of FIGURE 8 it will be apparent that when the rotor moves clockwise, one of the contacts 31 or 32 first effects charging of the capacitor and then the other effects discharging of the same. This is somewhat different than counter-clockwise operation where one of the contacts effects charging and then discharging. The functioning is the same, however, that is to say, alternatively connecting the power source with the capacitor for charging the same and connecting the capacitor with the bimetal for discharge therethrough.

Where it is desired that the safety switch be opened only when the vehicle is moving in the forward direction, a rotary switch of the type shown in FIGURE 9 may be used.

In FIGURE 9 the components which correspond with like components of FIGURE 8 are designated by the same numerals but with a prime mark. The disk 17' of the rotor mounts a contact 81 and the insulating base mounts terminals 82, 83, 84 and 85. As shown, the terminal 82 is connected to ground as indicated at 86; the terminal 83 is connected to the capacitor 4' as indicated at 90, the other side of the capacitor being grounded. The terminal 84 is connected to the bimetal element 3' as indicated at 91 and the terminal 85 is connected to the power source 62' as indicated at 92. The safety switch 2' is connected to the control mechanism 71' which is connected to source via the operating switch 66'.

Assume that the vehicle is moving forward and the rotor 17' has just started to move in the counter-clockwise direction. The tab 81a of the contact 81 engages the terminal 85 and since the contact 81 is in engagement with the terminal 83, the capacitor 4' is charged. With continued rotation of the contact 81, the tab 81a leaves the terminal 85 and then the end 81b engages the terminal 84. Thus, the capacitor 4' is interconnected to the bimetal element and discharges therethrough. With continued rotation the contact 81 moves to the position shown and with further rotation the tab 81a engages the terminal 85 and the cycle of charge and discharge as explained above is repeated. The discharge through the bimetal causes the same to expand or distort to open the safety switch 2' so that the control mechanism 71' is rendered inoperative.

When the vehicle is moving in the reverse direction the capacitor does not discharge through the bimetal as will be seen from the following explanation. Assume that the rotor is in the position shown and is starting to move clockwise. The end 81c of the contact 81 engages the terminal 82 which is connected to ground and since the contact 81 is also connected to the capacitor 4' via terminal 82, any charge on the capacitor is discharged. As rotation continues, the end 81c of the contact engages the terminal 83 and subsequently the tab 81a engages the terminal 85 so that the capacitor is charged. With continued rotation the tab 81a leaves the terminal 85 and then the end 81c engages the terminal 82 so that the capacitor is discharged to ground and not through the bimetal 3'.

I claim:

1. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a bimetal element, means operative in accordance with the motion of the vehicle in the forward direction to supply current to the bimetal element, the current causing heating of the element to distort the same, the distortion causing the element to open said safety switch.

2. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and a safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a bimetal element, means operative in accordance with the motion of the vehicle in the forward direction to supply current to the bimetal element, the current causing heating of the element to distort the same, the distortion causing the element to open the safety switch and operative in accordance with the motion of the vehicle in the reverse direction to cut off the current supply to said bimetal element.

3. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and a safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a capacitor, a bimetal element, a power source and switching means operable in accordance with the motion of the vehicle to alternatively connect the power source with the capacitor for charging the same and to connect the capacitor with the bimetal for discharge therethrough, the discharge causing heating of the element to distort the same and the element being disposed with respect to said safety switch so that the distortion opens the safety switch.

4. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and a safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a capacitor, a bimetal element, a power source and switching means operable in accordance with the motion of the vehicle in the forward direction to alternatively connect the power source with the capacitor for charging the same and to connect the capacitor with the bimetal element for charge therethrough, the discharge causing heating of the element to distort the same and the element being disposed with respect to said safety switch so that the distortion opens the safety switch and the switching means being operable in accordance with the motion of the vehicle in the reverse direction to alternatively connect the power source with the capacitor for charging the same and to connect the capacitor for discharge other than through said bimetal element.

5. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and a safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a capacitor, a bimetal element, a power source, and electrical contact means including a plurality of fixed contacts respectively connected to said capacitor, said bimetal element and said power source, together with a rotary contact rotatable in accordance with the vehicle motion, the rotation of the rotary contact connecting the terminals so that the capacitor is connected with the power source for charging the same and then connected with the bimetal element for discharging therethrough, the discharge causing heating of the bimetal element to distort the same and the bimetal element being disposed with respect to said safety switch so that the distortion opens the safety switch.

6. In a motor vehicle of the type having an automatic transmission with an electrically-operated control mechanism to cause the transmission to operate for moving the vehicle in the reverse direction and a power source to energize the control mechanism, means to prevent operation of the control mechanism for effecting reverse operation comprising: an operating switch and a safety switch, both interconnecting said control mechanism and said power source, the operating switch being actuable for operationally energizing and de-energizing said control mechanism and the safety switch being normally closed for the energizing of said control mechanism but, when open, preventing the energizing of said control mechanism; and means for controlling said safety switch including a capacitor, a bimetal element, a power source and electrical contact means including a plurality of fixed contacts respectively connected to said capacitor, said bimetal element and said power source, together with a rotary contact rotatable in accordance with the vehicle motion, the rotation of the rotary contact in one direction alternatively connecting the terminals so that the capacitor is connected with said power source for charging the same and then connected with the bimetal element for discharging therethrough, the discharge causing heating of the element to distort the same and the element being disposed with respect to said safety switch so that the distortion opens the safety switch and the rotation of the rotary contact in the opposite direction connecting the power source with the capacitor for charging the same and then connecting the capacitor for discharge other than through said bimetal element.

7. A device of the kind described comprising: a housing; a rotor rotatably mounted in said housing and having a pair of oppositely disposed hubs; drive means on one hub for use in drivingly connecting the hub to the speedometer cable of the vehicle so that rotation of the cable causes rotation of the rotor; drive means on said other hub for use in drivingly connecting the hub to the speedometer shaft of a vehicle so that rotation of the rotor causes rotation of the speedometer shaft; electrical contact means on said rotor; a plurality of terminals on said housing spaced about the rotational axis of the rotor to be engaged by said electrical contact means in accordance with the rotational position of the rotor; a capacitor on said housing electrically connected with one of said terminals; a normally closed safety switch on said housing; a bimetal element on said housing connected with another of said terminals and positioned with respect to said safety switch so that distortion of the element effects the opening and closing of the safety switch; and means connected to another of said terminals for use in connecting the same to a source of power.

8. A device of the kind described comprising: a housing; a rotor rotatably mounted in said housing and having a pair of oppositely disposed hubs; drive means on one hub for use in drivingly connecting the hub to the speedometer cable of the vehicle so that rotation of the cable causes rotation of the rotor; drive means on the other hub for use in drivingly connecting the hub to the speedometer shaft of the vehicle to that rotation of the rotor causes rotation of the speedometer shaft; a pair of arcuately-shaped electrical contacts on said rotor each being less than 180° of arc; three terminals on said housing spaced about the rotational axis of said rotor to be engaged by said contacts in accordance with the rotational position of the rotor, the first and second of the terminals being spaced 180° apart and the third being spaced 90° from the first and second; a normally closed safety switch on said housing; a bimetal element on said housing connected with the first of said terminals and positioned with respect to said switch so that distortion of the element effects opening and closing of the switch; means on said housing connected with said second terminal for use in connecting the terminal with a source of power; and a capacitor on said housing connected with said third terminal.

9. A device of the kind described comprising: a housing; a rotor rotatably mounted on said housing; drive means on said rotor for use in rotatably connecting the rotor to the speedometer cable of the vehicle so that rotation of the cable causes rotation of the rotor; drive means on said rotor for use in interconnecting the same with the speedometer shaft of the vehicle so that rotation of the rotor causes rotation of the speedometer shaft; a normally closed safety switch on said housing; a bimetal element on said housing positioned with respect to said safety switch so that distortion of the element effects the opening and closing of the switch; a capacitor on said housing for supplying current to said bimetal element; electrical contact means on said rotor; and a plurality of contacts on said housing spaced about the rotational axis of said rotor to be engaged by said contact means in accordance with the rotational position of the rotor, one of the terminals being connected with said capacitor, one with said bimetal element and one adapted to be connected with a source of power, the rotation of the contact means interconnecting the terminals so that the capacitor is connected to the power source for the charging of the capacitor and said capacitor is connected with the bimetal element for discharging the capacitor through the element.

References Cited in the file of this patent

UNITED STATES PATENTS

| | | |
|---|---|---|
| 2,140,812 | Ratti | Dec. 20, 1938 |
| 2,527,352 | Christian | Oct. 24, 1950 |
| 2,887,898 | Jovanovich et al. | May 26, 1959 |